Figure 1A:
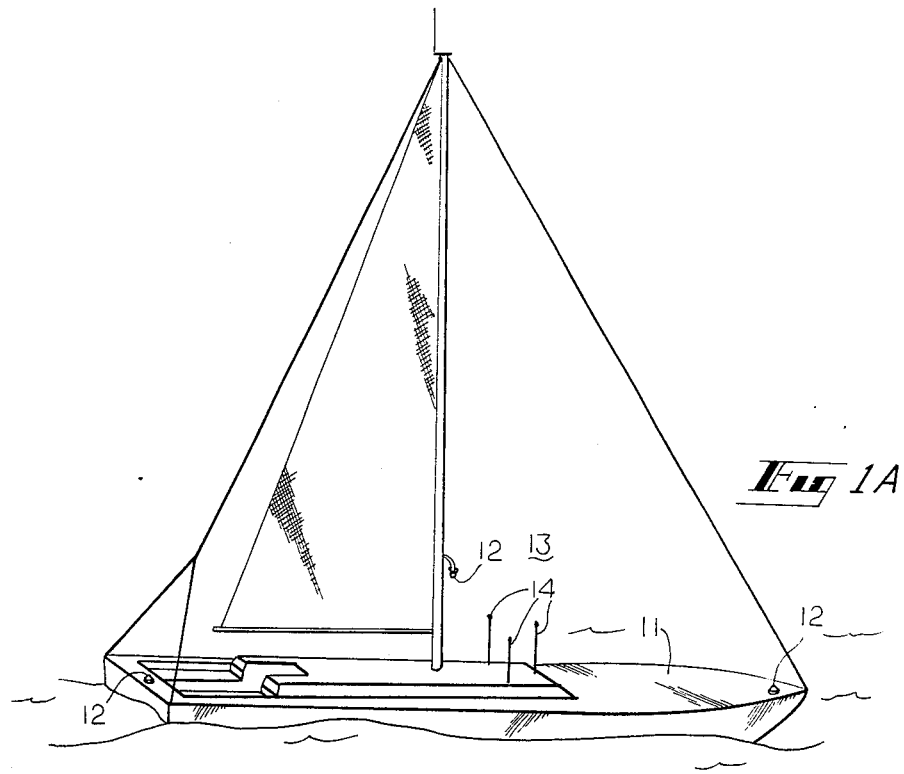

United States Patent [19]
Rowland et al.

[11] Patent Number: 4,813,025
[45] Date of Patent: Mar. 14, 1989

[54] SAFETY ALERT AND LOCATING SYSTEM

[75] Inventors: David B. Rowland, 1200 J Court Drive, Duluth Ga. 30136; William W. Smith, Jr., Goldsboro, N.C.

[73] Assignee: David B. Rowland, Duluth, Ga.

[21] Appl. No.: 60,863

[22] Filed: Jun. 12, 1987

[51] Int. Cl.⁴ .......................... H04B 1/59; G01S 3/80
[52] U.S. Cl. ........................................ 367/6; 367/127; 367/128; 441/89
[58] Field of Search ............... 367/127, 128, 130, 125, 367/6; 342/42, 44, 51; 441/80, 89

[56] References Cited

U.S. PATENT DOCUMENTS

| | | | |
|---|---|---|---|
| 3,854,117 | 12/1974 | Fothergill | 367/125 |
| 4,051,350 | 9/1977 | Parent | |
| 4,305,143 | 12/1981 | Simms et al. | 441/80 |
| 4,320,472 | 3/1982 | Fort | 367/79 |
| 4,590,591 | 5/1986 | LeRoy et al. | 367/6 |
| 4,635,236 | 1/1987 | Roberts | 367/130 |
| 4,673,936 | 6/1987 | Kotoh | 342/51 |

Primary Examiner—Thomas H. Tarcza
Assistant Examiner—Daniel T. Pihulic
Attorney, Agent, or Firm—David P. Kelley

[57] ABSTRACT

A system for monitoring the safety and location of individuals includes a portable transceiver worn by each individual and a base control unit for sending interrogation signals to the individual units. The interrogation signals are transmitted through both air and water, and the individual units transmit a response through the medium through which the interrogation signal was received. The base unit measures both the elapsed time from transmission to reception and the incoming phase angles of the response signal, and converts these measurements to indications of distance and angle between the base unit and the individual transceivers.

11 Claims, 6 Drawing Sheets

SAFETY ALERT AND LOCATING SYSTEM

BACKGROUND OF THE INVENTION

This invention relates to a system for automatically determining when a person under safety surveillance has exceeded safety limits, such as, for example, where a person has fallen overboard from a boat.

There has long been a need for a system capable of monitoring the location of crew members or passengers on a boat, and for automatically emitting an alarm signal when such a person has fallen overboard. In a worst case scenario, if a person were to fall overboard at night, when the event cannot be visually observed, it is vital that an alarm be sounded or given substantially immediately, before the separation between person and boat becomes too great. Various systems have been devised to accomplish this, some of which rely upon some sort of alarm transmission device attached to the person which sends a signal to a central station, which in turn responds in any of a variety of ways.

One such device is shown in U.S. Pat. No. 3,588,858 of Demouth, in which a radio transmitter on the person is actuated by a position sensitive switch, to create an alert or alarm situation when the person is in an abnormal position.

A more sophisticated overboard detecting arrangement is shown in U.S. Pat. No. 4,305,143 of Simmons et al in which an ultrasonic transmitter attached to the person is actuated by a hydrostatic switch, i.e., a switch that actuates when in water, to send ultrasonic signals through the water to a receiver on the boat. The receiver, in turn, takes action to sound an alarm, eject life preservers, stop the boat, or some other action aimed at initiating rescue operations.

U.S. Pat. No. 4,549,169 of Moura et al shows an arrangement wherein each person carries a radio transmitter on some portion of the body that will be submerged if the person falls overboard. Each transmitter continually transmits to a monitoring station, or, in one embodiment, responds to an encoded interrogation signal from the monitoring station. When a person falls overboard, the transmitter is submerged, and thus the monitoring station receives no more signals from it, thereby indicating that the person is in the water.

In U.S. Pat. No. 4,442,426 of Heuschmann et al, a monitoring system is shown in which a plurality of remote transmitter stations send signals to a central monitor in time staggered sequence. Each signal may be coded to identify the remote transmitter. When a danger situation arises, an alarm signal is sent without delay, breaking into the sequential pattern and thus informing the central monitor of an alarm condition.

In all of the foregoing prior art patents, an alarm or danger condition is indicated when it occurs, and, in some instances, the central station is capable of taking some sort of rescue or danger alleviating action. None of the patents shows a system capable of doing more than, say, stopping the boat or ejecting life preservers. Furthermore, if a person were to fall overboard at night and perhaps be knocked unconscious, there is no way of ascertaining any of the vital information relating to his location and distance from the boat. The only indication given by any of the aforementioned devices is that the person is in the water.

SUMMARY OF THE INVENTION

The present invention, through its unique system, is not only capable of indicating that an emergency situation exists and which particular person is in that situation, but it also, unlike the prior art arrangements, does not depend upon the person being conscious, or his position in water, i.e., whether or not his transmitter is submerged. In addition, unlike the prior art arrangements, the system of the present invention is capable of giving the location of the person in the water so that, even at night, his rescue may be effected.

In addition to the foregoing, the system is designed to place a minimum of power drain upon the remote units, i.e., the units worn by the crew and/or passengers, and further to permit the use of relatively simple remote units.

In one preferred embodiment of the invention, a base unit mounted on board the boat transmits an ultrasonic signal utilizing pulse width modulation to address the individual remote units. The pulse train so emitted is transmitted both through air and water (utilizing different ultrasonic frequencies) and contains timing information, address, and function information. By function is simply meant, for example, a command to answer, a command to provide a battery condition signal, a command to emit an audible beep so that the wearer of the remote unit knows his unit is functioning, a command for the remote unit to test itself, or some other function or functions which may be considered desirable. Each remote unit has its own unique address corresponding to a particular pulse width modulated pulse train, and, after receiving a timing signal, an address signal, and a function signal, responds as ordered by the base unit and the situation.

The remote unit is capable of transmitting both a radio signal for air transmission and an ultrasonic signal for underwater transmission and is programmed to transmit in or through the particular medium through which the interrogation signal from the base unit is received. Thus, if the remote unit is underwater, it receives the ultrasonic signal from the base unit that has been transmitted through the water, and replies by emitting an ultrasonic pulse underwater. On the other hand, if the ultrasonic signal from the base unit is received through the air, the remote unit transmits a radio frequency pulse back to the base unit.

The base unit receives the signals from the remote units by way of a set of radio antennae mounted on board the boat, or a set of ultrasonic transducers mounted on the boat below the water line. The geometry of the antennae provide RF phase discrimination and the geometry of the ultrasonic transducers provide time of arrival discrimination from which the angle of arrival of the signal from the remote unit can be determined, thereby giving an indication of the azimuth location of the remote unit. The base unit also measures the round trip time of its emitted signal and of the received signal, and, from this, gives an indication of the range or distance from the boat to the remote unit. Thus, even at night, when a person falls overboard, it is possible, with the present invention, virtually to pinpoint the location in the water of the person, as well as ascertain, at least to some extent, his condition based upon whether his remote unit transmits a radio or an ultrasonic response signal, thereby indicating whether the unit is above the water or submerged. In practice, the base unit continuously interrogates the remote units in sequence. When the remote units are on the boat, the response of each unit will be a radio signal, and the measured response time will be extremely short, indicating a safe condition to the base unit. The base unit may be set to recognize one or more thresholds of elapsed time, which, if exceeded, indicate an alarm condition. This permits adjusting the system to take into account the size of the boat, and, for example, the person's assigned station on the boat.

Figure 1B:
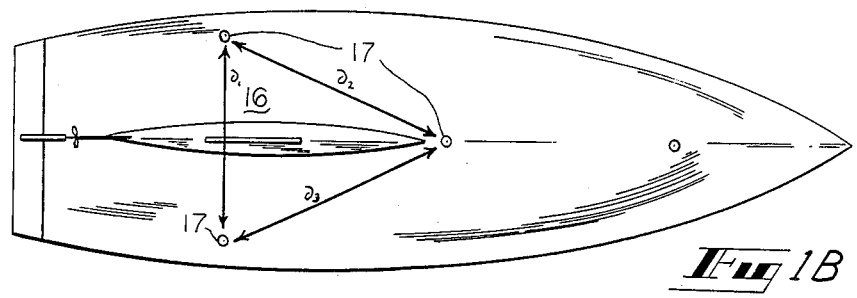
Figure 1C:
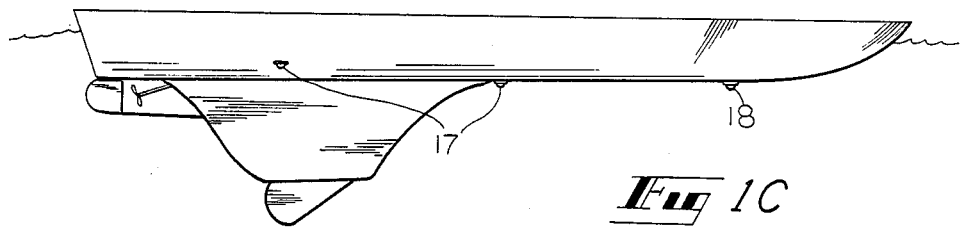
Figure 2:
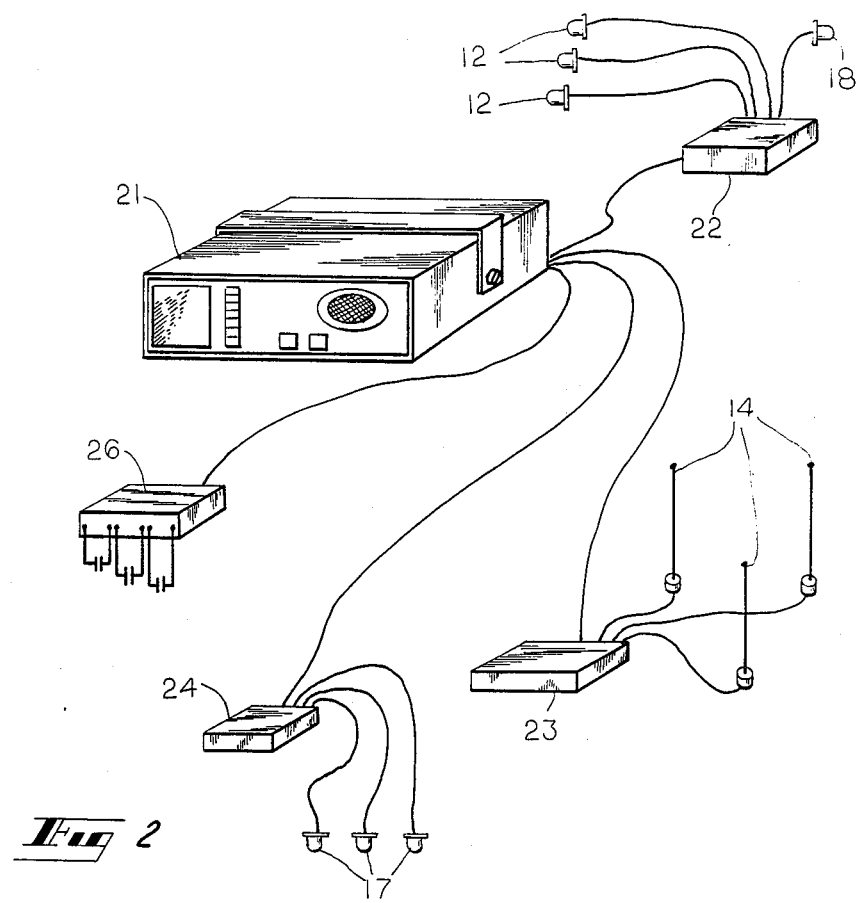
Figure 3:
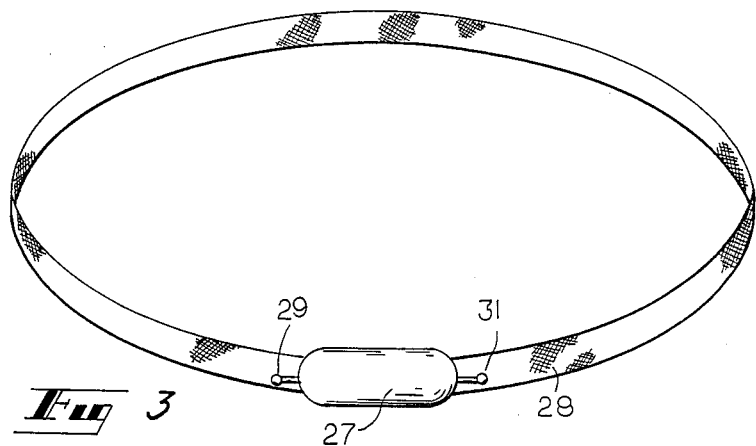
Figure 4:
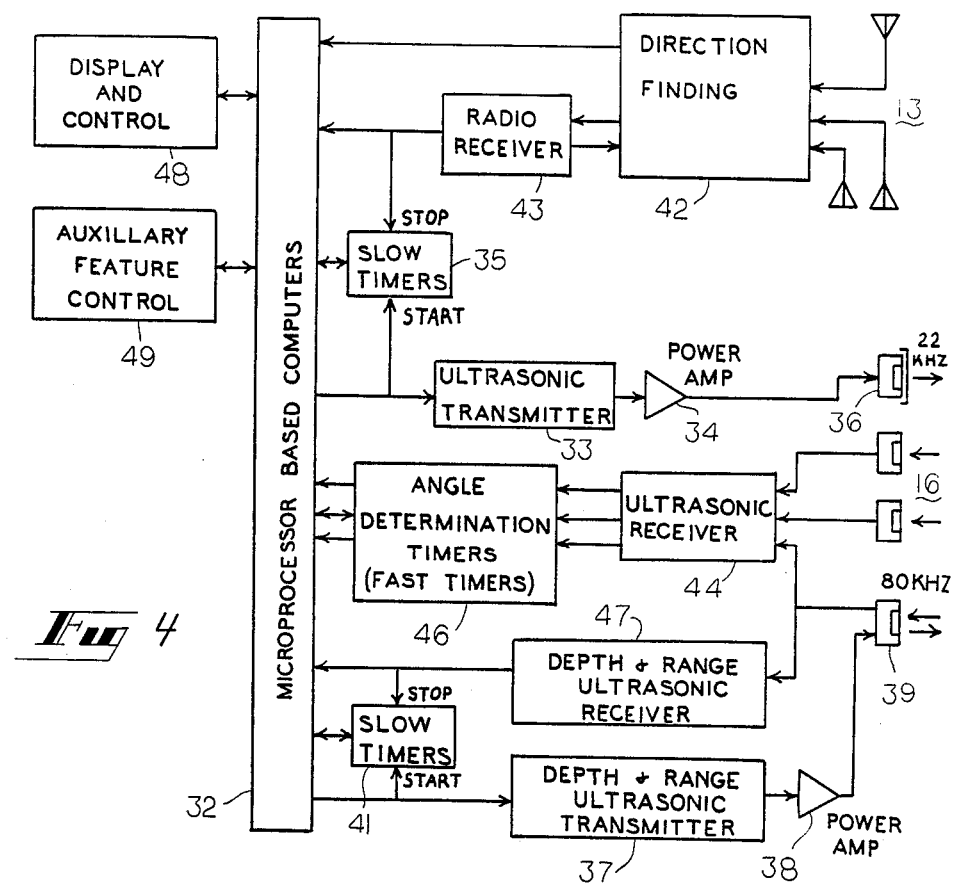
Figure 5:
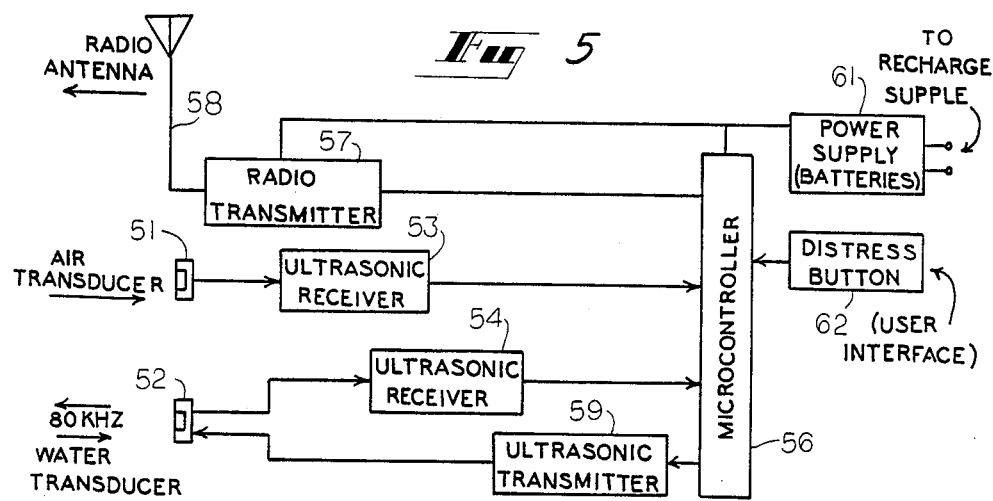
Figure 6:
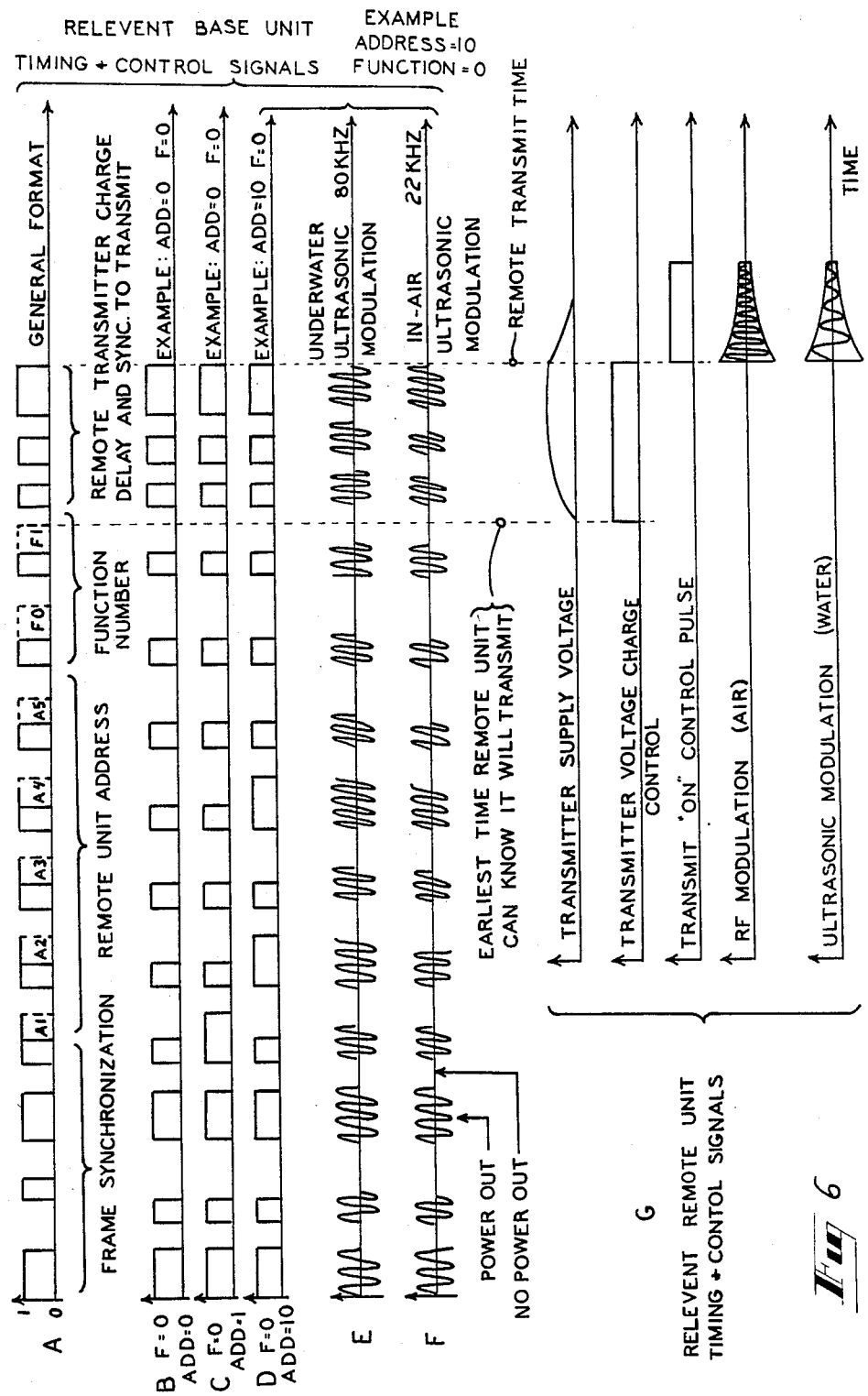
Figure 7:
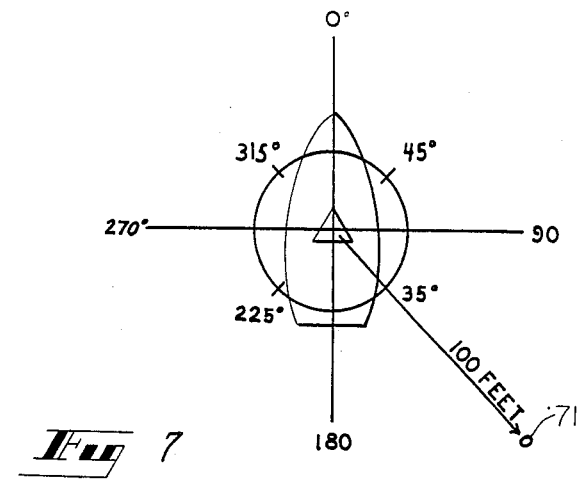
Figure 8:
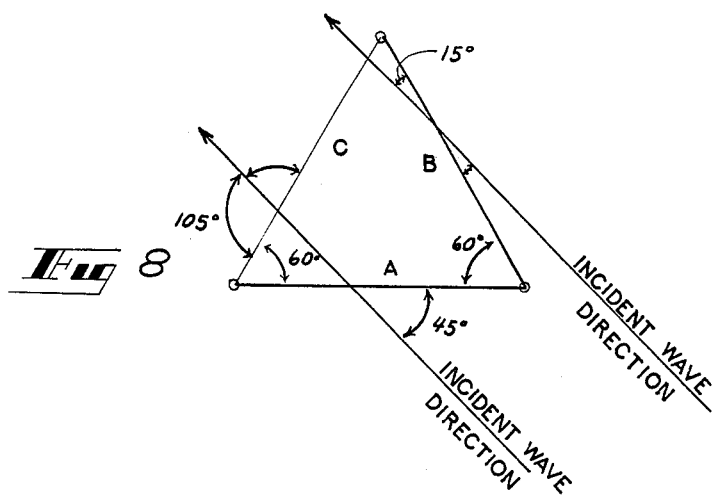
Figure 9:
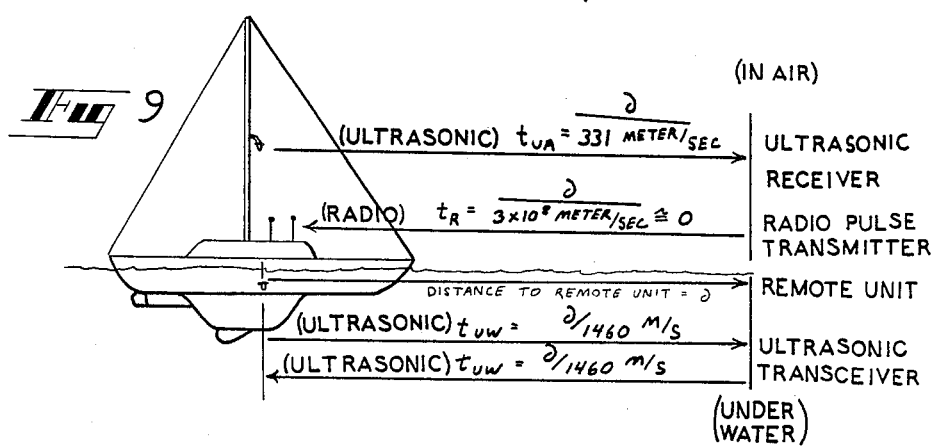
Figure 10:
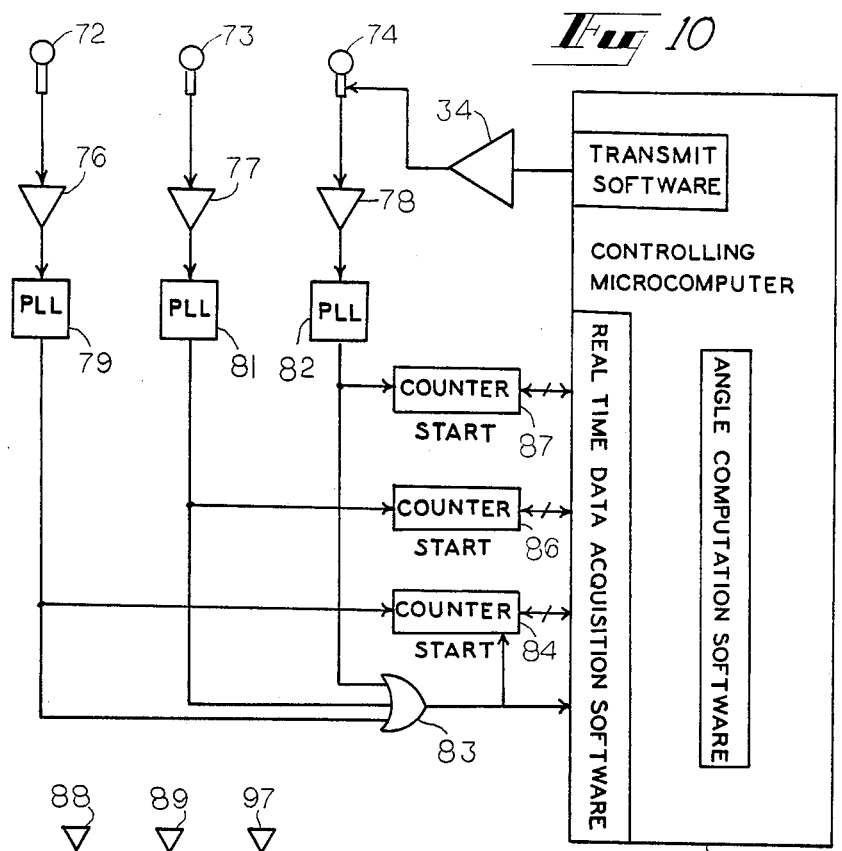
Figure 11:
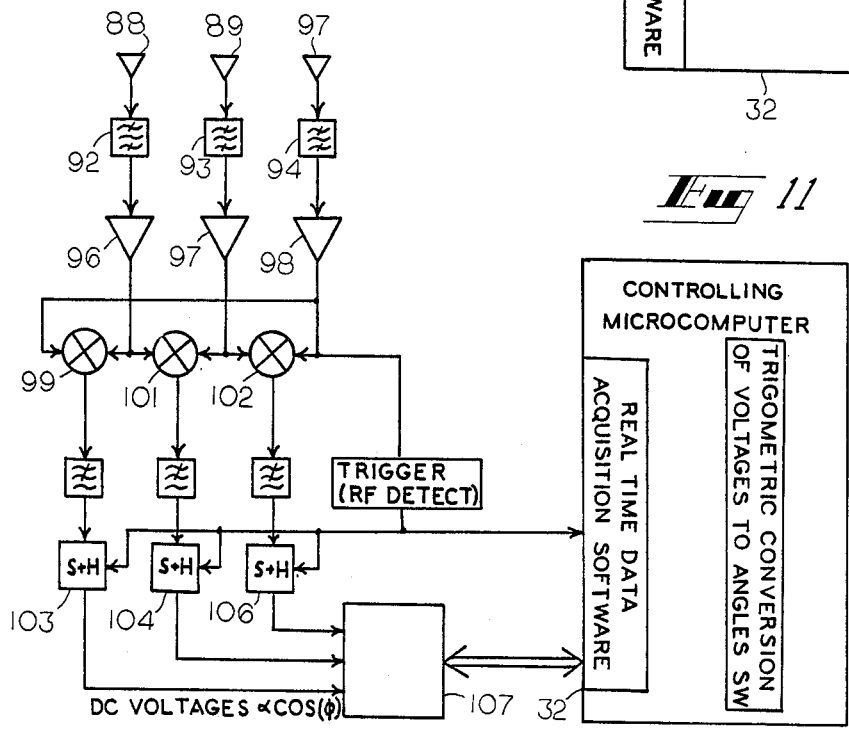

The various features of the present invention will be more readily understood from the following detailed description, read in conjunction with the drawings, in which:

FIG. 1A is a view of a sailboat showing elements of the present invention,

FIG. 1B is a plan view of the bottom of the boat showing the ultrasonic transducer arrangement, FIG. 1C is an elevational view of the hull of the boat, FIG. 2 is a view of the base control unit and the connection to various elements of the invention, FIG. 3 is a view of the remote unit and mounting means therefor, FIG. 4 is a block diagram of the base unit, FIG. 5 is a block diagram of a remote unit, FIG. 6 is a diagram depicting the various electrical and ultrasonic signals involved in the operation of the invention, FIGS. 7, 8, and 9 are diagrams depicting the operation of the invention in an emergency situation, FIG. 10 is a block diagram of one example of the ultrasonic direction finding arrangement; and FIG. 11 is a block diagram of one example of the radio direction finding arrangement.

FIGS. 1A, 1B, and 1C depict a sailboat 11 equipped with the system of the present invention. On board boat 11 are mounted, for example, three ultrasonic transmitters 12 which, as will be explained more fully hereinafter, transmit coded ultrasonic signals through the air under control of a central base unit, now shown. Also on board boat 11 is a radio frequency receiving antenna array 13 comprising three antenna members 14 arranged in a triangular array for receiving radio frequency signals from the remote units. On the hull of the boat 11, as best seen in FIGS. 1B and 1C, is a triangular array 16 of three ultrasonic transducers 17 for receiving underwater ultrasonic signals from a remote unit. Note that in both the case of the antennae and the ultrasonic transducers, the triangular arrangement is shown by way of example only for convenience of description with the only requirement being that two or more non-parallel lines, each parallel to the azimuth plane, be defined by their arrangement. Also mounted underwater on the hull of the boat is an ultrasonic transmitter 18 for transmitting coded underwater ultrasonic signals to a remote unit. While receivers 17 and transmitters 18 are shown as separate entities, present day ultrasonic transducers such as 17 are also capable of transmitting in which case transmitters 18 would not be necessary.

In FIG. 2 there is shown a base control unit 21 which may take any of a number of forms, that being shown here being simply an illustrative form. Shown as satellite elements of the control unit are an ultrasonic transmitter element 11, a radio receiver element 23, and an ultrasonic transceiver element 24. Also shown is an auxiliary function control unit 26. While elements 22, 23, 24, and 26 are shown separated from base control unit 21, it is to be understood that they may be enclosed within unit 21.

In FIG. 3 there is shown a remote unit 27 worn around the waist of a person. This arrangement is only one of a number of alternatives; the unit 27 may be attached to the wrist, worn on a collar or headband, or attached to a lifejacket, for example. Belt 28 contains an insulated conductor strip (not shown) designed to function as an omnidirectional radio signal transmitting antenna. Unit 27 includes an ultrasonic transducer 29 for receiving ultrasonic signals from the base unit, and an ultrasonic transmitter 31 for transmitting ultrasonic signals back to the base unit. In the event that transducer 29 is also capable of transmission, transmitter 31 is not necessary.

FIGS. 4 and 5 are block diagrams of the base unit components and of a remote unit's components respectively, all of the components being standard with the possible exception of the direction and range calculating circuits, which will be discussed more fully hereinafter. The base unit of FIG. 4 comprises a central control microprocessor 32 which activates the "air" ultrasonic signal generator 33, whose output is amplified in amplifier 34 and emitted through transducer 36. Microprocessor 32 may be, for example, a Motorola #68 HC 11, a commercially available device. At the same time, a timer circuit 35 that counts at approximately a 10 kHz rate is turned on. Microprocessor 32 activates the "underwater" ultrasonic signal generator 37, the output of which is amplified in amplifier 38 and emitted through transducer 39. At the same time, a second 10 kHz timer circuit 41 is turned on.

Incoming radio signals from a remote unit are received in antenna array 13 and passed to a direction finding circuit 41 which will be explained more fully hereinafter. The output of circuit 41 is passed directly to microprocessor 32 and also to a radio receiver 43 whose output turns off counter 35. Incoming ultrasonic signals are received by transducer array 16, passed through ultrasonic receivers 44 to an angle determining timing circuit 46, the output of which is directed to the microprocessor 32. At the same time, the incoming ultrasonic signal is directed to a range receiver 47 whose output turns off timer 41.

The microprocessor output based upon the processed received signals is directed to a display and control circuit 48 which gives the information from the signals to the operator of the system. The microprocessor output is also directed to an auxiliary feature circuit 49 which may be used, for example, to release flares, send a distress signal, steer the boat, or stop the engines.

The remote unit of FIG. 5 comprises an "air" ultrasonic receiving transducer 51 and "water" transducer 52. While shown as separate elements, transducers 51 and 52 may be a single transducer. The received signals are passed through ultrasonic receivers 53, 54 to the microcontroller 56. Microcontroller 56 may be, for example, a Motorola #6805, which responds as discussed heretofore, i.e., when addressed by the base unit via the incoming signal, controller 56 determines whether to send a radio signal response through transmitter 57 and antenna 58, or an ultrasonic signal through ultrasonic transmitter 59 and transducer 52. A suitable power supply 61, which preferably is rechargeable batteries, supplies the necessary power for the foregoing units. The remote unit may also contain a distress button 62 which permits the user to initiate a distress signal from the remote unit to the base unit.

FIG. 6 depicts the various signals utilized in this present embodiment of the system. In order to utilize the simplest possible remote units, the base unit 21, through element 22, transmits a series of high powered ultrasonic (pulse) signals, at, for example, 80 kHz frequency through air by way of transmitters 12. Pulse width modulation is utilized to supply synchronization, addresses, and function commands to the remote unit. The general format of the transmitted pulse train from base unit to remote units is shown in A, B, C, and D are examples of the transmitted pulse train for address zero with function zero; address one with function zero; and address ten with function zero, respectively. E and F depict the actual pulse modulated carrier for the pulse train of D, at the two carrier frequencies of 22 kHz and 80 kHz. The five address bits allow up to thirty-two remote units to be addressed, and the two function bits permit up to four functions. Examples of functions include a request for a ranging and direction finding pulse, a pulse for battery good indication, a pulse for good self-test results, and a request for the remote unit to present a beep to its user.

The use of pulse width modulation allows the remote unit to lock to a wide range of base unit data rates without concern for high stability timing in either the base or remote units. By recording the time between the modulation transmissions and knowing the synchronization format, the remote unit can determine the serial stream timing. By using the data pulse transition times during a polling frame, the remote unit can achieve a highly accurate determination of the base unit's data clock rate, thus reducing some of the effects of noise and clock speed variations on the system, and allowing the remote unit to fire an accurate response pulse. When the remote unit receives the frame synchronization, it is alerted that a polling message is on its way, and it will synchronize its receiver timing to that of the transmitter.

By the time the address and function bits have passed, the remote unit will know whether or not it is to transmit a response. In the case illustrated in D, E, and F, unit ten is addressed. If required to reply, unit ten begins to charge its transmitter power supply during the allotted delay and synchronization period shown, as depicted in the top two waveforms of G. The remote unit now transmits a single pulse, a radio frequency pulse if the polling signal was received in the air, or an ultrasonic pulse if the signal was received in the water.

The foregoing sequence is readily achievable through the use of inexpensive and simple state of the art general purpose microprocessors, single chip microcontrollers, and standard radio and ultrasonic transceivers.

FIGS. 7, 8, and 9 illustrate a hypothetical example for a case where someone is in the water at a distance of 100 feet from the boat and at an angle of 135 degrees to the bow of the boat. For simplicity, the boat is illustrated in FIG. 7 as pointing due north. The boat has a triangular array of 3 radio antennae, each separated by a quarter wavelength, mounted on the deck of the boat with a similar triangular array of ultrasonic transducers, each separated by one meter, mounted beneath the water on the hull. Note that these particular dimensions and the equilateral triangular shape of the arrays facilitate the symmetry of this example although any suitable non-colinear array can work if triangles containing the bases of the antenna array and ultrasonic transducer array are in a plane which is as parallel to the surface of the water as is reasonable on a boat.

Assuming the central control unit has interrogated the remote unit 71, and the unit 71 has responded, either by emitting a radio frequency pulse or an ultrasonic pulse, the array 13 of radio antennae or array 16 of ultrasonic transducers receives the incident wave (ultrasonic or RF) as shown in FIG. 8. Where the array of FIG. 8 represents radio frequency antennae, it can be readily appreciated that the incident wave arrives at each end of each side of the triangular array (sides A, B, and C) with a different phase. Through well known techniques, the phase angles can be converted to voltages, each of which is related to the geometric angle of incidence by the expression:

$$V(phase) = V(scale) \times \cos[90° \times \cos\theta][volts] \quad (1)$$

where $V(phase)$ is the DC voltage corresponding to the electrical phase difference of the signals received by a given pair of antennae $V(scale)$ is a voltage constant dependent upon equipment $\theta$ is the geometric angle of incidence (a quarter wavelength separation between antenna pairs is assumed.)

In the example given in FIGS. 7, 8, and 9, and with some noise added to facilitate a realistic example, differential phases of:

$P(a) = 63.6°$
$P(b) = 86.9°$
$P(c) = -23.3°$ where P is the electrical phase produce voltages of $V(a) = 0.445[mV]$
$V(b) = 0.054[mV]$
$V(c) = 0.918[mV]$ Substituting these voltages into equation (1) with appropriate reference frame shifts gives the possible pairs of incident angles:

$\theta(a) = 135.1$ or $44.9°$
$\theta(b) = 134.9$ or $165.1°$
$\theta(c) = 135.0$ or $285.0°$ Using the multiple pairs of redundant information, the microprocessor's software in the base control unit resolves the ambiguity of each antenna pair and recognizes the correct angle of the remote unit from the boat as being approximately 135 degrees, and indicates this through a numeric register or a display diagram.

Where the array of FIG. 8 represents ultrasonic transducers, the action is similar to that of the radio frequency arrangement except that time delays are used instead of electrical phases. When the arriving ultrasonic wave first impinges upon the transducer closest to the signal source, a counter is activated for each transducer pair with each counter in turn stopping when the pulse impinges on the third transducer. It can be shown that the geometric angle $\theta$ is given by the expression:

$$\theta = \cos^{-1}\left(t(sec) \times \frac{1460}{sec}\right)[degrees] \quad (2)$$

where:

t is the difference in time between a given pair of transducers as determined from the counters as measured in seconds 1460 [meters/second] is the velocity of the ultrasonic wave through water (a one meter spacing between transducer pairs is assumed.)

In the example of FIGS. 7, 8, and 9:

Δt(a)=484[microseconds]
Δt(b)=662[microseconds]
Δt(c)=177[microseconds]
which from equation (2) gives
θ(a)=135.0 or 45.0°
θ(b)=134.9 or 164.9°
θ(a)=135.0 or 285.0°
after correcting for the angular rotation of the transducer pairs from the bow of the boat. As is the case with the radio frequency signal, the base control unit recognizes 135 degrees as the correct angle.

In determining the distance or range of the remote unit from the boat, it is only necessary for the computer in the base control unit to measure elapsed time. As is shown in FIG. 4, the ultrasonic signal from the central control unit activates a slow timer, which begins counting and continues to do so until a reply signal is received or a predetermined excessive time period elapses or the preset time threshold is exceeded. If the reply signal is a radio frequency signal, the measured elapsed time is that of the ultrasonic signal to the remote unit through air, since the radio signal return time and the processing times of the remote and base units are negligible. Inasmuch as the return signal is a radio signal, it means the remote unit received the interrogation signal through the air, hence the elapsed time represents the travel time of the ultrasonic interrogation signal in the air to the remote unit. The distance or range of the remote unit is thus given by:

$$d[\text{meters}] = t(ua)[\text{seconds}] \times 331 \ [\text{meters/second}] \quad (3)$$

where:
t(ua) is the elapsed time of the ultrasonic signal travel time through air
d is distance
331[meters/second] is the speed of sound in air.

In the example of FIGS. 8, 9, and 10, the measured time is 0.921 seconds, hence the range is 30.45 meters or approximately 100 feet, and the control unit indicates this through a suitable display or by other means.

Exactly the same method of calculation applies for an ultrasonic signal received through water, except that the total round trip time is measured, so to determine range, one half of the total time is used. This is shown by:

$$d[\text{meters}] = 1460[\text{meters/second}] \times 0.5 \times t(uw)\text{-}[\text{second}] \quad (4)$$

where:
t(uw) is the round trip elapsed time of ultrasonic signal travel time through water
d is distance
1460[meters/second] is the speed of sound in water.
In the example of FIGS. 8, 8, and 9, the total time is measured as 0.0418 seconds which when substituted into equation (4) gives a distance of 30.5 meters or approximately 100 feet.

In the operation of the system, the base control unit cycles through interrogations of each remote unit. The computer in the base unit can be set, depending upon the size of the boat, to ignore response times that are below a certain minimum threshold which correspond to a remote unit being within a determined range, and to sound an alarm for response times over that threshold which indicate that a remote unit is beyond the determined range. In addition, of an ultrasonic response is received, it indicates that the remote unit is beyond the determined range. In addition, if an ultrasonic response is received, it indicates that the remote unit of interest received its interrogation signal via water, hence the unit must be in the water, and the central control unit will sound an alarm or in some other way indicate a "man overboard" condition.

FIG. 10 is a block diagram of one example of the ultrasonic direction finding arrangement utilizing generic, commercially available components. Each of the three receiving transducers 72, 73, 74 is connected through amplifiers 76, 77, 78 respectively, the outputs of which are connected respectively to phase-locked loop frequency detectors 79, 81, 82. All three phase-locked loop frequency detectors are connected to a starter timer trigger which, when any one of the transducers 72, 73, or 74 receives a signal, starts three counter circuits 84, 86, 87 which are connected to the frequency detector outputs of loops 79, 81, 82 respectively. When each transducer's phase-locked loop locks, which signifies the passage of the leading edge of a remote unit's response pulse, the corresponding counter is stopped. When all three counters have stopped, the microprocessor unit 32 takes the measured times and computes the geometric angle of incidence of the received signals in accordance with equation (2) as illustrated in the above exmaple.

FIG. 11 is a block diagram of one example of the radio direction finding arrangement utilizing generic, commercially available components. In FIG. 11, the three RF receiving antennae 88, 89, 91, are connected through narrow bandpass filters 92, 93, 94 respectively to radio amplifiers and automatic gain control circuits 96, 97, 98. The individual antenna signals are then paired and multiplied in RF mixers 99, 101, 102 to produce a DC component which is a function of the electrical phase between antenna paris. The DC outputs of the mixers 99, 101, 102 are sampled in sample and hold circuits 103, 104, 106 and digitized in an analog to digital converter 107 then applied to the microcomputer for computation of the geometric angle of incidence of the received wave in accordance with equation (1).

The entire system, as depicted in the drawings and explained in the specification, can be constructed of standard commercially available components, thereby insuring a large measure of reliability at minimal cost. For example, the ultrasonic transducers may be EDO Model 6166, the phase locked loops may be National Model LM 567, and the counters may be Intel Model 8235. These are simply examples of the commercial availability of the parts.

While the principles of the invention and the operation thereof have been illustrated in an overboard alert system, the invention is susceptible to other uses as well, such as monitoring groups of children, monitoring swimmers, or even monitoring the location of inanimate objects. Various other uses or modifications of the present invention may occur to workers in the art without departure from the spirit and scope thereof.

ADDENDUM

OPERATING SEQUENCE: COMPUTER PROGRAMS

The following are PASCAL-like pseudocode programs showing the actions in the form of procedures and their execution sequence within the base and remote units. These codes do not include details of real time operations such as event sequencing, acquision of ultrasonic and radio signals, or factory test software.

BASE UNIT

```
power up
initial computer self-test
if (fail self-test)
    alert user by flashing all panel displays
display test pattern
initialization
    activate previously requested software functions
    load default values
        check keyboard for:
            on-board/in-water/off status of each remote unit
            alert if low battery in remote unit
    update display
loop until (power down)
    check onboard /in-water/off user front panel
        switches
    if (transition in onboard/in-water/off switches by user)
        save latest desired onboard/in-water/off state
        poll all active units up to N times or until reply
        if (1 or more units is outside its expected zone)
            update display to show latest unit "gone" or "overboard"
            sound appropriate alarms
            activate any ancillary functions (flares, dye markers, radio for help . . .)
            update display to show last computed range and direction to latest transitioned remote unit
    poll all active units for battery supply status
        save all reply states for status display
        if (alert on low battery function is on)
            sound appropriate alarm
            activate any ancillary functions
    respond to any change of display format requests
        (example: show range/direction to any other unit)
        (example: show any other status information)
        on-going computer self-test
end loop
```

REMOTE UNIT

```
power on
self-test
    check all checkable hardware and software
    if (self-test fails)
        do nothing
    else
        beep and continue
loop until (power down)
    initialize
        get unit address from EEPROM or pc board traces
        reset all clocks
    if (receive air or water modulation)
        begin synchronization timers
    if (synchronization field is correct)
    if (address field is correct)
    if (this unit's address)
    if (function field is correct)
    if (function requires a battery check)
        check battery charge level
    if (function requires a pulse transmission)
        turn on transmit charge power
    if (time to transmit)
        turn off transmit charge power
        turn on appropriate (air or water) transmitter
    if (time to turn off transmitter)
        turn off transmitter
    reset all clocks
    if (function was a beep)
        beep
end loop
```

We claim:

1. A safety alert and locating system comprising,
   means for transmitting first and second coded interrogation signals from a central location, each of said first and second interrogation signals containing at least one address code, said first signal being transmitted through a first transmission medium and said second signal being transmitted through a second, different transmission medium,
   one or more individual means adapted to receive said coded signals, each of said individual means being located at a distance from and at an angle to said central location and being responsive to its own address code contained in said first and second signals,
   each of said individual means being adapted to transmit a response signal upon receipt of at least one of said first and second signals addressed to it, the response signal being transmitted through the transmission medium through which the signal was received,
   means at said central location for receiving the signal transmitted by said individual means, and
   location determining means at the central location for determining from the received signal the distance and angle of said individual means relative to said central location.

2. A safety alert and locating system as claimed in claim 1 wherein said means for transmitting comprises means for transmitting said first signal through air and means for transmitting said second signal through water.

3. A safety alert and locating system as claimed in claim 1 wherein said first and second coded interrogation signals are ultrasonic signals of different frequencies.

4. A safety alert and locating system as claimed in claim 1 wherein each of said individual means transmits an ultrasonic response signal through water when it receives an interrogation signal through water, and transmits a radio frequency signal through air when it receives an interrogation signal through air.

5. A safety alert and locating system as claimed in claim 1 wherein said first and second coded interrogation signals comprise pulse width modulated ultrasonic signals containing timing, address, and function segments.

6. A safety alert and locating system as claimed in claim 1 wherein each of said individual means transmits a single pulse response signal upon receipt of a coded interrogation signal addressed to it.

7. A safety alert and locating system comprising
   a base unit,
   a plurality of remote units located at an angle to said base unit,
   said base unit including means for transmitting first and second encoded interrogation signals through first and second transmission media respectively to individual ones of said remote units, said signals requiring a finite time to reach said remote units,
   each of said remote units being adapted to respond to interrogation signals addressed thereto to transmit a response signal through whatever transmission medium said remote unit is in, means associated with said base unit adapted to receive the response signals from said remote units, said means including first means for measuring the time that elapses from transmission of the interrogation signal to reception of the response signal and converting the time thus measured to a distance indication, said means associated with said base unit including a plurality of spaced signal receiving members each of which responds differently to the response signal depending upon the angle of incidence of the response signal upon said plurality of signal receiving members and means for measuring the differences between individual ones of said members as the response signal is received, and converting the differences to an azimuth indication.

8. A method of monitoring the condition and location of one or more individual entities comprising:

transmitting coded interrogation signals addressed to different ones of the entities wherein the coded interrogation signals are transmitted through air and water simultaneously, receiving a response signal from each of the individually addressed entities, measuring the time that elapsed from transmitting an interrogation signal to receiving a response signal and converting the time measure to an indication of distance to the entity, and converting the received response signal from each individual entity to an indication of the angle of said individual entity relative to a central location.

9. A method of monitoring the condition and location of one or more individual entitles as claimed in claim 8 wherein the response signals are received through the air.

10. A method of monitoring the condition and location of one or more individual entities as claimed in claim 8 wherein the response signals are received through water.

11. A method of monitoring the condition and location of one or more individual entities as claimed in claim 8 wherein the individual entities are addressed in sequence by the interrogation signals.

* * * * *